(12) United States Patent
Fortin

(10) Patent No.: US 8,157,303 B2
(45) Date of Patent: Apr. 17, 2012

(54) VEHICLE END STRUCTURE

(75) Inventor: Hugo Fortin, Commerce Township, MI (US)

(73) Assignee: Nissan North America, Inc., Franklin, TN (US)

( * ) Notice: Subject to any disclaimer, the term of this patent is extended or adjusted under 35 U.S.C. 154(b) by 167 days.

(21) Appl. No.: 12/709,028

(22) Filed: Feb. 19, 2010

(65) Prior Publication Data

US 2011/0204680 A1 Aug. 25, 2011

(51) Int. Cl.
*B60R 19/24* (2006.01)
*B60R 19/52* (2006.01)
(52) U.S. Cl. ..................................... 293/115; 296/193.1
(58) Field of Classification Search .................. 293/108, 293/115, 120; 296/181.1, 181.2, 187.09, 296/193.1; 180/68.6; *B60R 19/52*
See application file for complete search history.

(56) References Cited

U.S. PATENT DOCUMENTS

| | | | |
|---|---|---|---|
| 6,886,872 B2 | 5/2005 | Matsumoto et al. | |
| 7,152,916 B2 | 12/2006 | Roussel | |
| 7,311,352 B2 * | 12/2007 | Flotzinger | 296/193.1 |
| 7,641,267 B2 * | 1/2010 | Makino | 296/193.1 |
| 8,020,905 B2 * | 9/2011 | Nakayama | 293/115 |
| 2009/0096193 A1 | 4/2009 | Robins | |

* cited by examiner

*Primary Examiner* — Dennis Pedder
*Assistant Examiner* — Jason S Daniels
(74) *Attorney, Agent, or Firm* — Global IP Counselors, LLP

(57) ABSTRACT

A vehicle end structure mainly includes a vehicle bumper fascia and a grille assembly. The vehicle bumper fascia includes a sill portion and a receiving member extending from the sill portion. The receiving member defines a channel with an opening extending in a forward vehicle facing direction. The grille assembly includes inner grille and outer grille members that are coupled together. The inner grille member has a support member formed at a periphery of the inner grille member. The support member is disposed in the channel of the receiving member to limit movement of the inner grille member in a direction normal to the forward vehicle facing direction. The outer grille member is disposed on a forward vehicle facing side of the inner grille member to conceal the support member from view in the first direction.

29 Claims, 12 Drawing Sheets

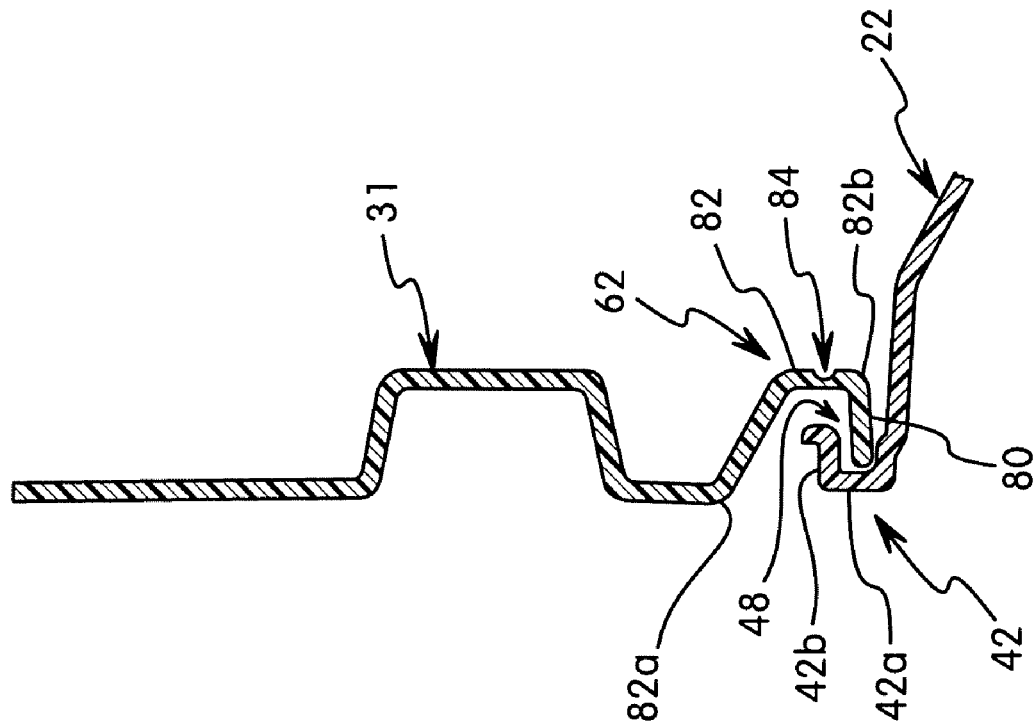
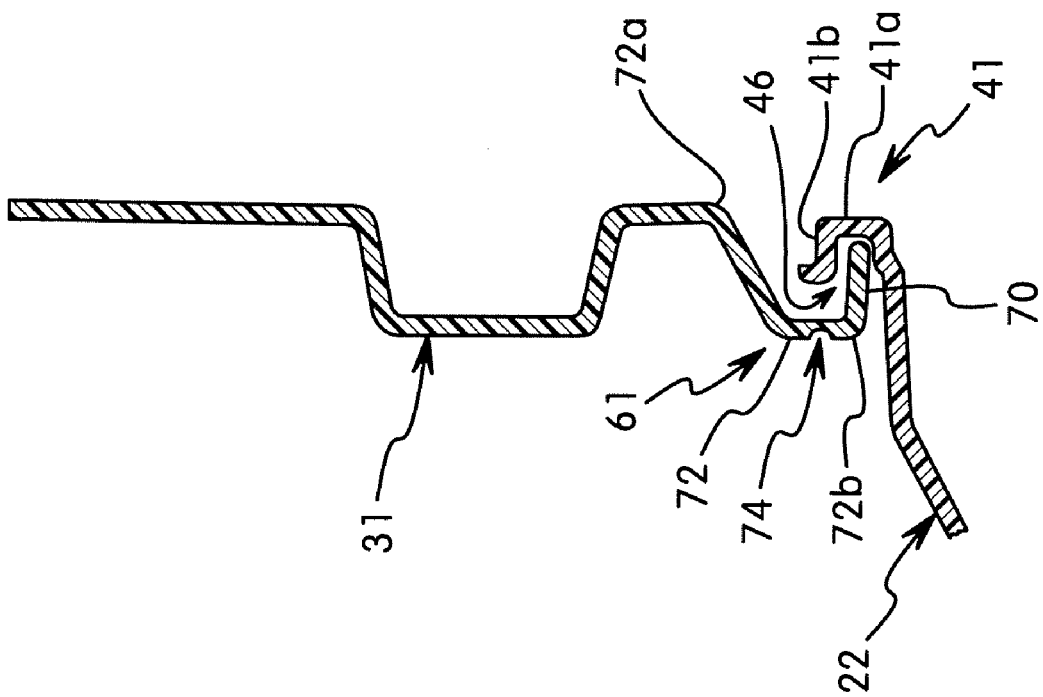

VEHICLE END STRUCTURE

BACKGROUND

1. Field of the Invention

The present invention generally relates to alignment and positioning of a grille for a vehicle. More specifically, the present invention relates to alignment and positioning of a grille with respect to a bumper fascia defining a portion of a grille opening in which the grille is installed.

2. Background Information

A front end of a vehicle often has a grille and a bumper fascia for providing an attractive appearance for the vehicle as well as for covering various components of the vehicle. The bumper fascia is a decorative and contoured panel which conceals the structural members that form the bumper structure. Typically the bumper structure includes a metal beam extending across the front of the vehicle that is concealed by bumper fascia. The bumper fascia is usually formed of a polymeric material. The grille is usually deposed above the bumper fascia had has a plurality of holes or apertures. These apertures create an entryway for air to engine compartment, which is mainly for use in heat exchangers such as the radiator and transmission oil cooler. One example of a front end arrangement for a vehicle is disclosed in U.S. Patent Publication No. 2004/0124643. Some grilles are formed of two parts such as an inner grille member and a outer grille member. The inner grille member extends completely within the grille opening. The inner grille member typically includes the holes or apertures for air to enter the engine compartment. The outer grille member of the grille is positioned forward of the inner grille member and typically extends around a portion of the periphery of the inner grille member to create a decorative appearance and conceal the periphery of the inner grille member.

SUMMARY

When mounting a grille to a vehicle, it has been discovered that grilles tend to sag at the center overran extended period of time. When a sagging condition has occurred, the center of the grille appears to be closer to the upper surface of the bumper fascia than the sides of the grille. This sagging condition is often due to the lack of support for the grille (inner and outer grille members) in the center portion due to the desire to maximize the entryway for air through the grille. Additionally, some polymeric materials can exhibit sagging over a period of time when exposed to high heat, either from ambient conditions or high operating temperatures of adjacent components such as an engine. Also, relative large grilles are more susceptible to sagging due to the large mass of the grille.

Another issue that occurs when mounting a grille to a vehicle is that alignment of the grille with respect to adjacent exterior components, such as the bumper fascia and headlights can sometimes be difficult and/or a time consuming process. Each component of the vehicle is designed to have dimensional tolerances as well as assembly tolerances. In the case of a vehicle front end structure, these tolerances can affect the actual or apparent alignment of components with respect to each other. For grilles, the tolerances can particularly affect the appearance that the grille is centered with respect to the bumper fascia and headlights. This is typically determined by the size of the gaps that appear between the grille and the surrounding components. While a gap is desirable to reduce contact between parts and allow for thermal expansion and contraction, excessive and/or uneven gaps reduce the perceived quality of the vehicle as a whole.

In view of the state of the known technology, a vehicle end structure has been proposed to improve the design of grilles with respect to these known issues. In view of the state of the known technology, one aspect a vehicle end structure is proposed that mainly comprises a vehicle bumper fascia and a grille assembly. The vehicle bumper fascia includes a sill portion partially defining a grille opening and a receiving member extending from the sill portion. The receiving member defines a channel with an opening extending in a forward vehicle facing direction. The grille assembly includes an inner grille member and an outer grille member with the inner and outer grille members being coupled together. The inner grille member extends substantially within the grille opening. The inner grille member has a peripheral portion with a support member formed at a periphery of the peripheral portion of the inner grille member. The support member is disposed in the channel of the receiving member with the channel of the receiving member limiting movement of the support member of the inner grille member in a direction normal to the forward vehicle facing direction. The outer grille member is disposed along at least a portion of the peripheral portion of the inner grille member on a forward vehicle facing side of the inner grille member. The outer grille member conceals the support member from view in the first direction.

BRIEF DESCRIPTION OF THE DRAWINGS

Referring now to the attached drawings which form a part of this original disclosure:

FIG. 13 is a profile cross sectional view of the inner grille member and the bumper fascia of the vehicle front end structure as seen along section line 13-13 of FIG. 5; and FIG. 14 is a profile cross sectional view of the inner grille member and the bumper fascia of the vehicle front end structure as seen along section line 14-14 of FIG. 5.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
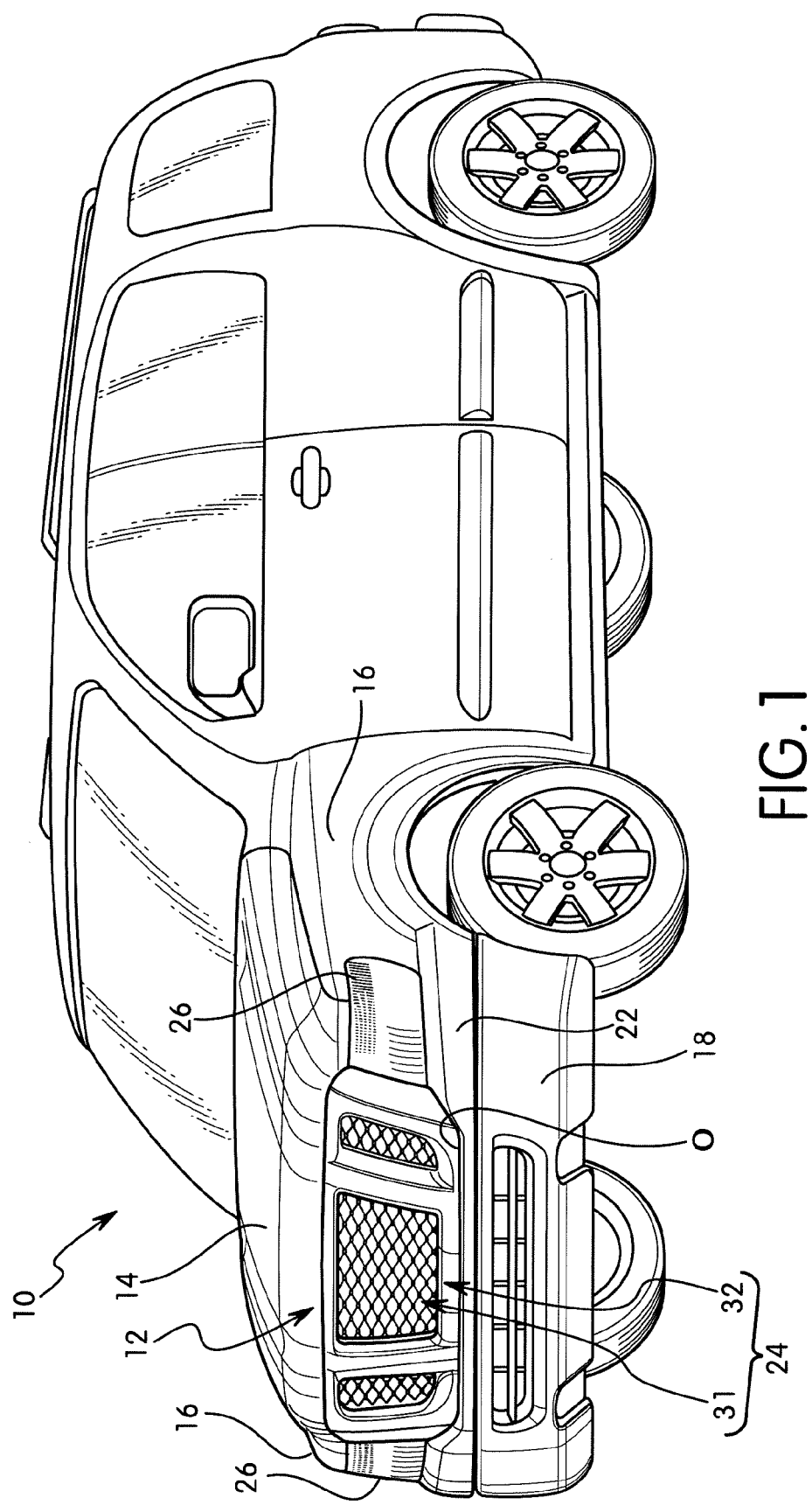
FIG. 1 is a perspective view of a vehicle that is equipped with a vehicle front end structure in accordance with one embodiment.
Figure 2:
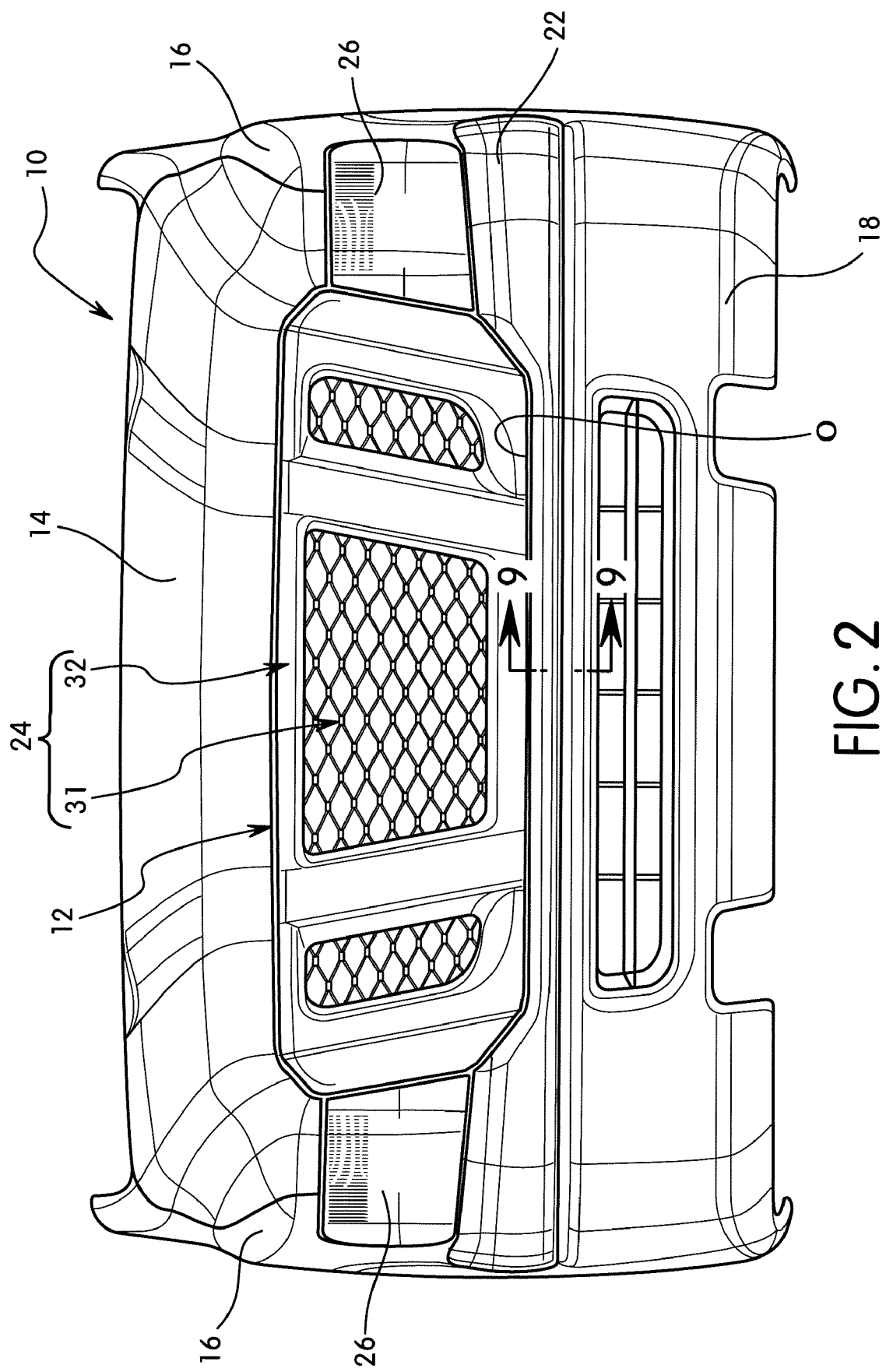
FIG. 2 is a front side elevational view of the vehicle front end structure illustrated in FIG. 1.

Referring initially to FIG. 1, a vehicle 10 is illustrated that is equipped with a vehicle front end structure 12 in accordance with one embodiment. The vehicle 10 is conventional, except for the vehicle front end structure 12 as described herein. As seen in FIGS. 1 and 2, the vehicle front end assembly 12 exteriorly mates with a vehicle hood 14, a pair of fenders 16 and a lower bumper shell 18. Accordingly, the vehicle 10 and its various parts will not be discussed and/or illustrated in detail herein, except as related to the vehicle front end structure 12. The vehicle front end structure 12 is designed to improve the fit and finish between its parts.

Figure 3:
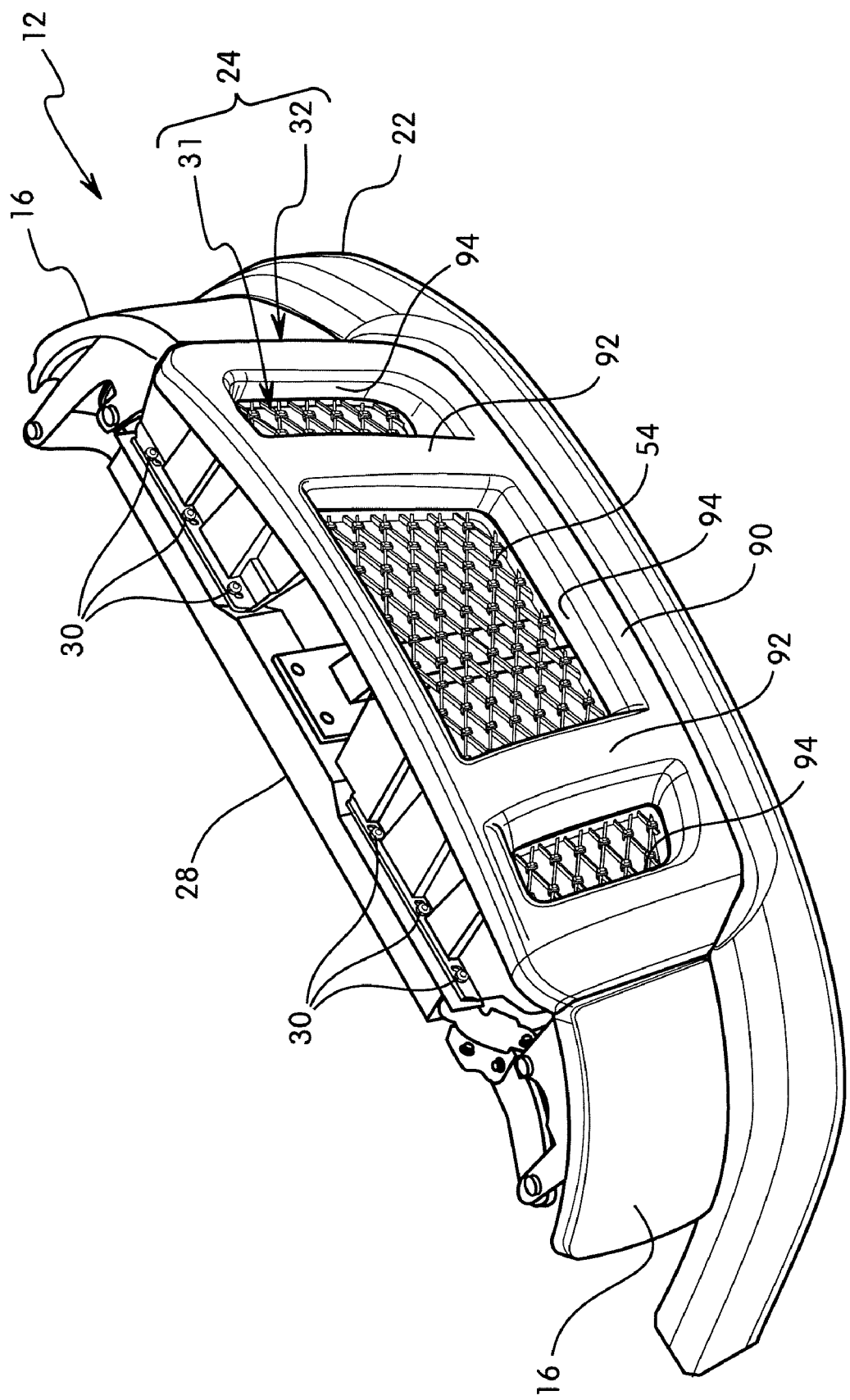
FIG. 3 is a perspective view of the vehicle front end structure illustrated in FIGS. 1 and 2.
Figure 4:
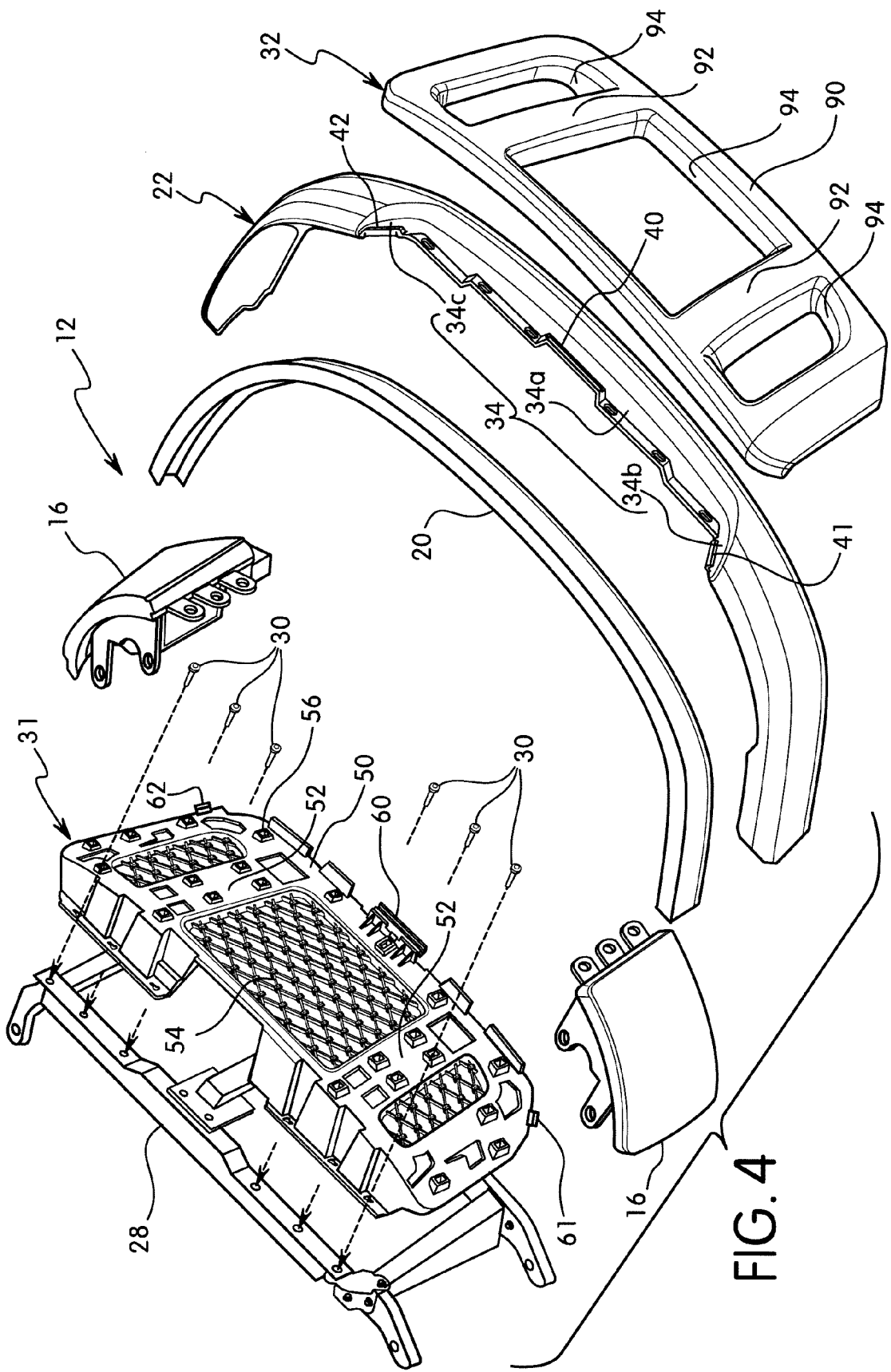
FIG. 4 is an exploded perspective view of the vehicle front end structure illustrated in FIGS. 1 to 3.

As seen in FIGS. 3 and 4, the vehicle front end assembly 12 mainly includes a vehicle bumper 20, a vehicle bumper fascia 22, a grille assembly 24, a pair of lamp assemblies 26 and a front end module support 28. The grille assembly 24 is disposed in a grille opening O of the vehicle 10. The vehicle bumper fascia 22 defines a lower edge of the grille opening O, while the lamp assemblies 26 define the lateral edges of the grille opening O. The vehicle hood 14 defines an upper edge of the grille opening O. As seen in FIGS. 3 and 4, the grille assembly 24 mainly includes an inner grille member 31 and an outer grille member 32. In the illustrated embodiment, the inner and outer grille members 31 and 32 are coupled together by a plurality of snap-fit connections.

As seen in FIGS. 3 and 4, the grille assembly 24 is connected to the front end module support 28 by a plurality of fastening clips 30. The fastening clips 30 support the upper end of the grille assembly 24. In the illustrated embodiment, the connections of the fastening clips 30 between the grille assembly 24 and the front end module support 28 have dimensional tolerances as well as assembly tolerances which result in a small amount of relative movement between the grille assembly 24 and the front end module support 28 prior to complete assembly of the vehicle front end structure 12.

Figure 9:
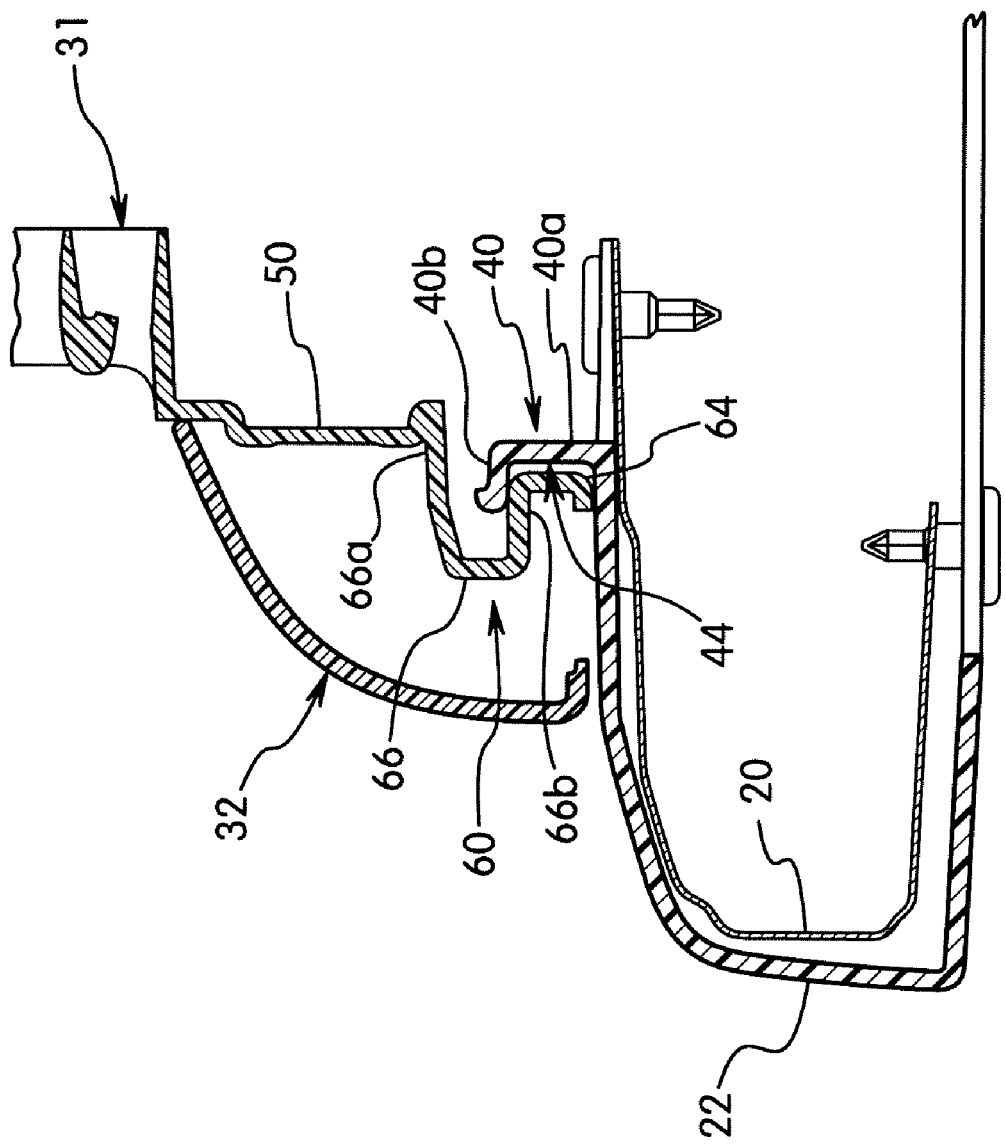
FIG. 9 is a profile cross sectional view of a portion of the vehicle front end structure illustrated in FIGS. 1 to 4 as seen along section line 9-9 of FIG. 2.
Figure 10:
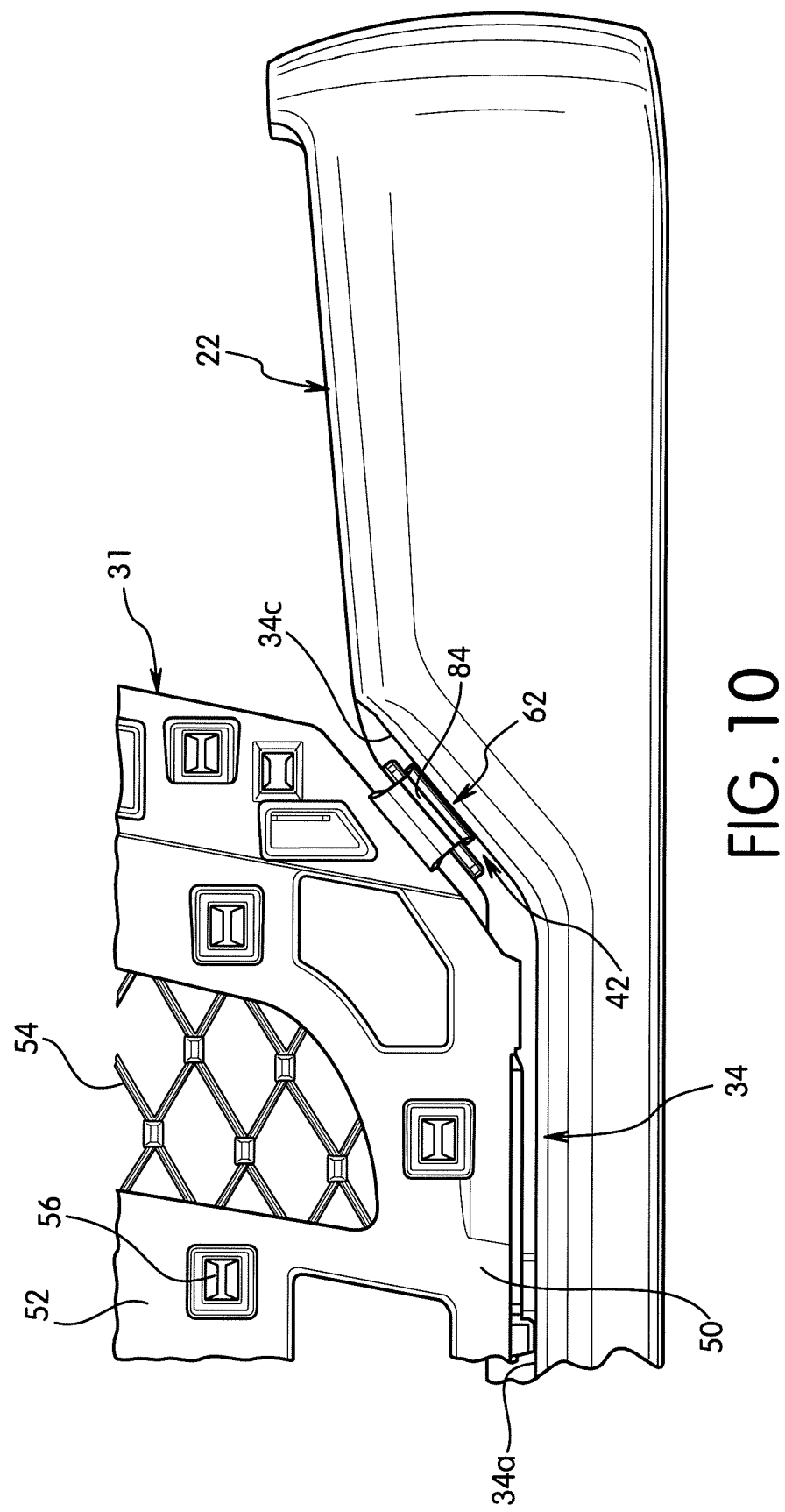
FIG. 10 is a front side elevational view of a lateral end portion of the inner grille member and the bumper fascia of the vehicle front end structure illustrated in FIGS. 1 to 5.
Figure 12:
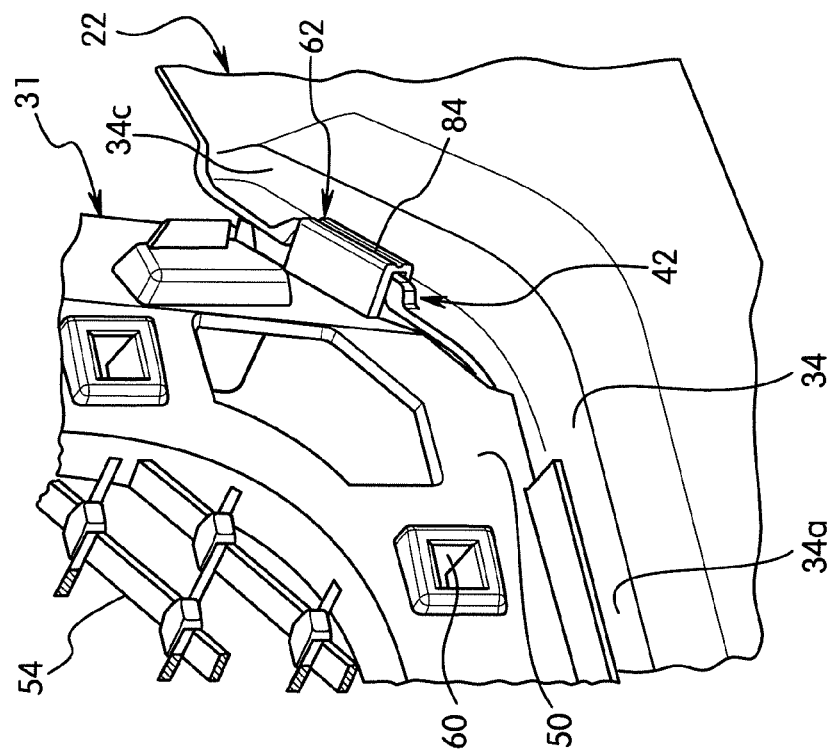
FIG. 12 is a front side perspective view of the lateral end portion of the inner grille member and the bumper fascia of the vehicle front end structure illustrated in FIGS. 10 and 11.
Figure 11:
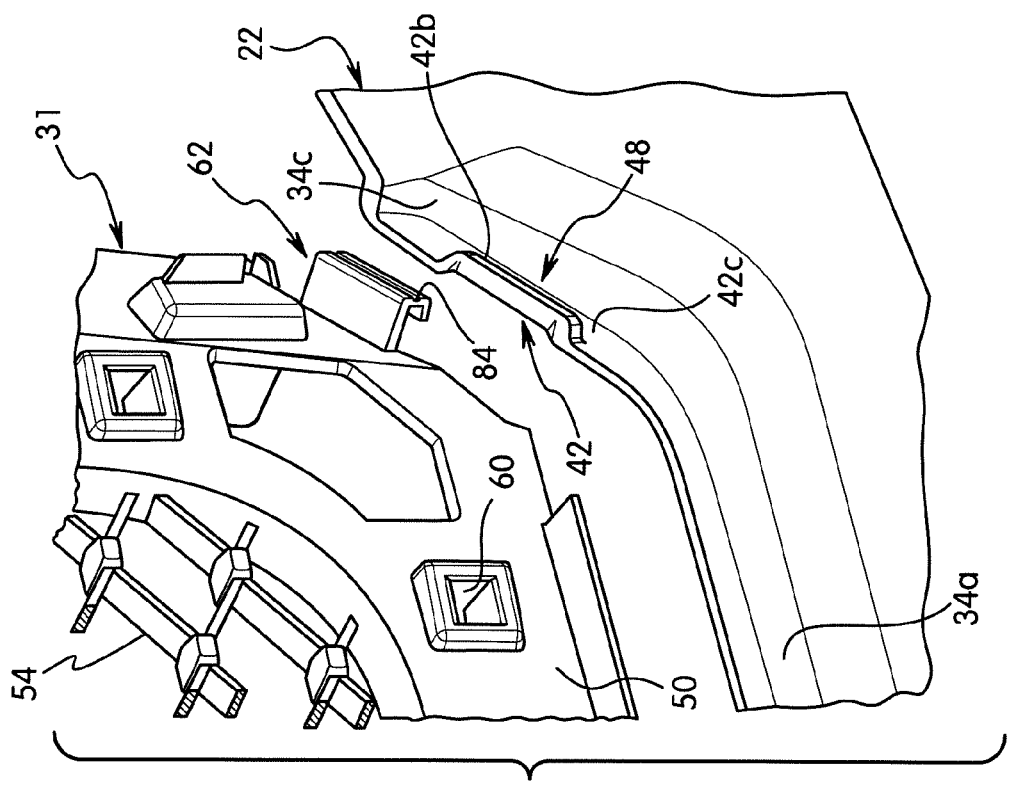
FIG. 11 is an exploded front side perspective view of the lateral end portion of the inner grille member and the bumper fascia of the vehicle front end structure illustrated in FIG. 10.

As seen in FIGS. 4 and 9, the vehicle bumper 20 is a bumper metal beam that extends across the front of the vehicle 10 and disposed under the vehicle bumper fascia 22. Thus, the vehicle bumper 20 is concealed by the bumper fascia 22. The vehicle bumper 20 is fixed to the vehicle body in a conventional manner. Preferably, the vehicle bumper 20 is constructed of a rigid metal material that is suitable for a front bumper. The vehicle bumper 20 constitutes a non-sagging support member. Thus, the vehicle bumper 20 is a rigid support for the vehicle bumper fascia 22 and the grille assembly 24 that cooperates with the vehicle bumper fascia 22 and the grille assembly 24 to aid in preventing sagging of the grille assembly 24 as discussed below.

As seen in FIGS. 3 and 4, the lamp assemblies 26 are identical except that they are mirror images of each other. In the illustrated embodiment, the lamp assemblies 26 are supported by the front end module support 28 and the rear side of the inner grille member 31. The exact configuration of the lamp assemblies 26 will depend on the particular configuration of the vehicle 10. However, in the illustrated embodiment, each of the lamp assemblies 26 is fastened to the front end module support 28 by a pair of bolts and fastened to the rear side of the inner grille member 31 by a clip or bolt. In the illustrated embodiment, the grille assembly 24 is configured such that the inner grille member 31 can easily be attached to the lamp assemblies 26 and the front end module support 28. As explained below, the vehicle bumper fascia 22 and the inner grille member 31 of the grille assembly 24 mate together to center the grille assembly 24 with respect to the lamp assemblies 26. Thus, the centering of the grille assembly 24 by the mating features of the vehicle bumper fascia 22 and the inner grille member 31 aiding maintaining equal lateral gaps between the grille assembly 24 and the lamp assemblies 26.

As seen in FIGS. 3 and 4, the front end module support 28 is a rigid member that is formed of suitable materials. The front end module support 28 supports the upper end of the grille assembly 24 and the upper ends of the lamp assemblies 26. In the illustrated embodiment, the upper end of the inner grille member 31 of the grille assembly 24 has a plurality of openings that receive the fastening clips 30 to secure the upper end of the inner grille member 31 to the front end module support 28. The clips 30 between the grille assembly 24 and the front end module support 28 have dimensional tolerances as well as assembly tolerances which result in a small amount of relative movement between the grille assembly 24 and the front end module support 28 prior to complete assembly of the vehicle front end structure 12. Of course, it will be apparent to those skilled in the art from this disclosure that other configurations of the front end module support 28 are possible as needed and/or desired. Thus, the front end module support 28 is illustrated in a simplified form for the sake of illustration.

The vehicle bumper fascia 22 is a one-piece, unitary member formed of a thin, lightweight sheet material such as a rigid plastic material (e.g., a thermoplastic olefin elastomer) or any other suitable material. In any case, the vehicle bumper fascia 22 should be constructed of a self supporting material with a degree of flexibility such that the vehicle bumper fascia 22 is flexible yet maintains its shape. In the illustrated embodiment, the vehicle bumper fascia 22 includes an elongated transverse portion, a first bent end portion and a second bent end portion such that the vehicle bumper fascia 22 has a wide, substantially U-shaped overall profile as viewed from above (FIG. 4). The vehicle bumper fascia 22 covers the vehicle bumper 20. The elongated transverse portion of the vehicle bumper fascia 22 includes a sill portion 34 that partially defines the grille opening O. The elongated transverse portion of the vehicle bumper fascia 22 is fastened to the vehicle bumper 20 by a plurality of fasteners (see FIG. 9) in a conventional manner. The first and second bent end portions of the vehicle bumper fascia 22 are also mounted to the fenders 16 via a plurality of fasteners (not shown). Since the connections between the vehicle bumper fascia 22 and the fenders 16 is not relevant to the mounting of the vehicle bumper fascia 22 to the front end module support 28, the connections between the vehicle bumper fascia 22 and the fenders 16 will not be discussed herein.

Basically, the sill portion 34 is the part of the vehicle bumper fascia 22 that forms the top or upwardly facing surface of the vehicle bumper fascia 22. The sill portion 34 directly supports the inner grille member 31 using three receiving members 40, 41 and 42. The receiving members 40, 41 and 42 have an inverted L-shaped cross section that extends from the bumper fascia 22 in an area that is proximal to the grille opening O. A first portion of the L-shaped cross sections of the receiving members 40, 41 and 42 extend from the bumper fascia 22 toward the grille opening O, while a second portion of the L-shaped cross sections of the receiving members 40, 41 and 42 extend in a forward vehicle direction of the vehicle 10.

The sill portion 34 includes a center sill section 34a having the receiving member 40, a first lateral positioning sill section 34b having the receiving member 41, and a second lateral positioning sill section 34c having the receiving member 42. The receiving member 40 constitutes a center receiving member, while the receiving members 41 and 42 constitutes first and second lateral receiving members, respectively.

As seen in FIGS. 5 to 9, the center sill section 34a supports the inner grille member 31 of the grille assembly 24 to aid in preventing sagging of the grille assembly 24. The center receiving member 40 is located on the center sill section 34a between the first and second lateral positioning sill sections 34b and 34c. In particular, the center receiving member 40 extends upwardly from the center sill section 34a of the sill portion 34 and directly contacts the inner grille member 31 of the grille assembly 24 to aid in preventing sagging of the grille assembly 24. The center receiving member 40 defines a center channel 44 with the center channel 44 having its channel opening extending in a forward vehicle facing direction. The center receiving member 40 has an L-shaped cross sectional profile. A first part 40a of the L-shaped cross sectional profile extends from the sill portion 34 and a second part 40b of the L-shaped cross sectional profile extends forward from the first part 40a such that the center channel 44 is defined by the first part 40a, the second part 40b and the sill portion 34.

Figure 5:
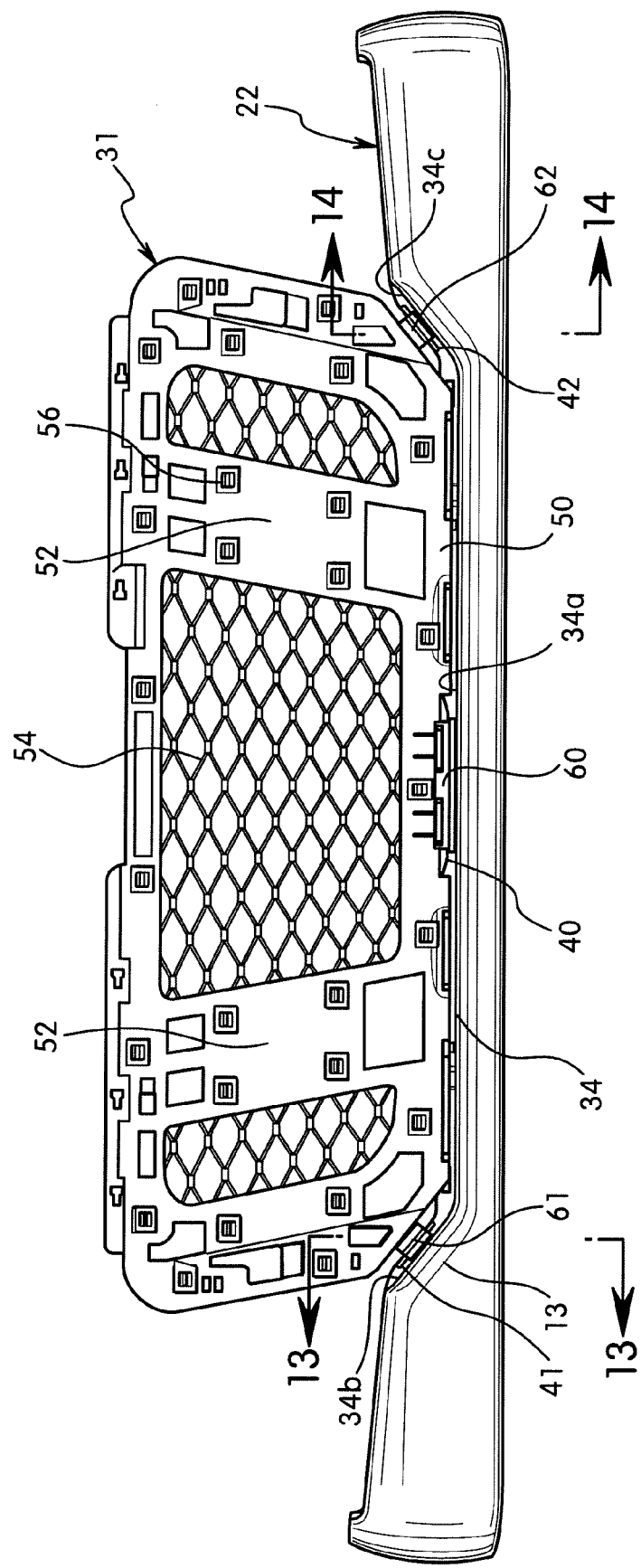
FIG. 5 is a front side elevational view of the inner grille member and the bumper fascia of the vehicle front end structure illustrated in FIGS. 1 to 4.
Figure 6:
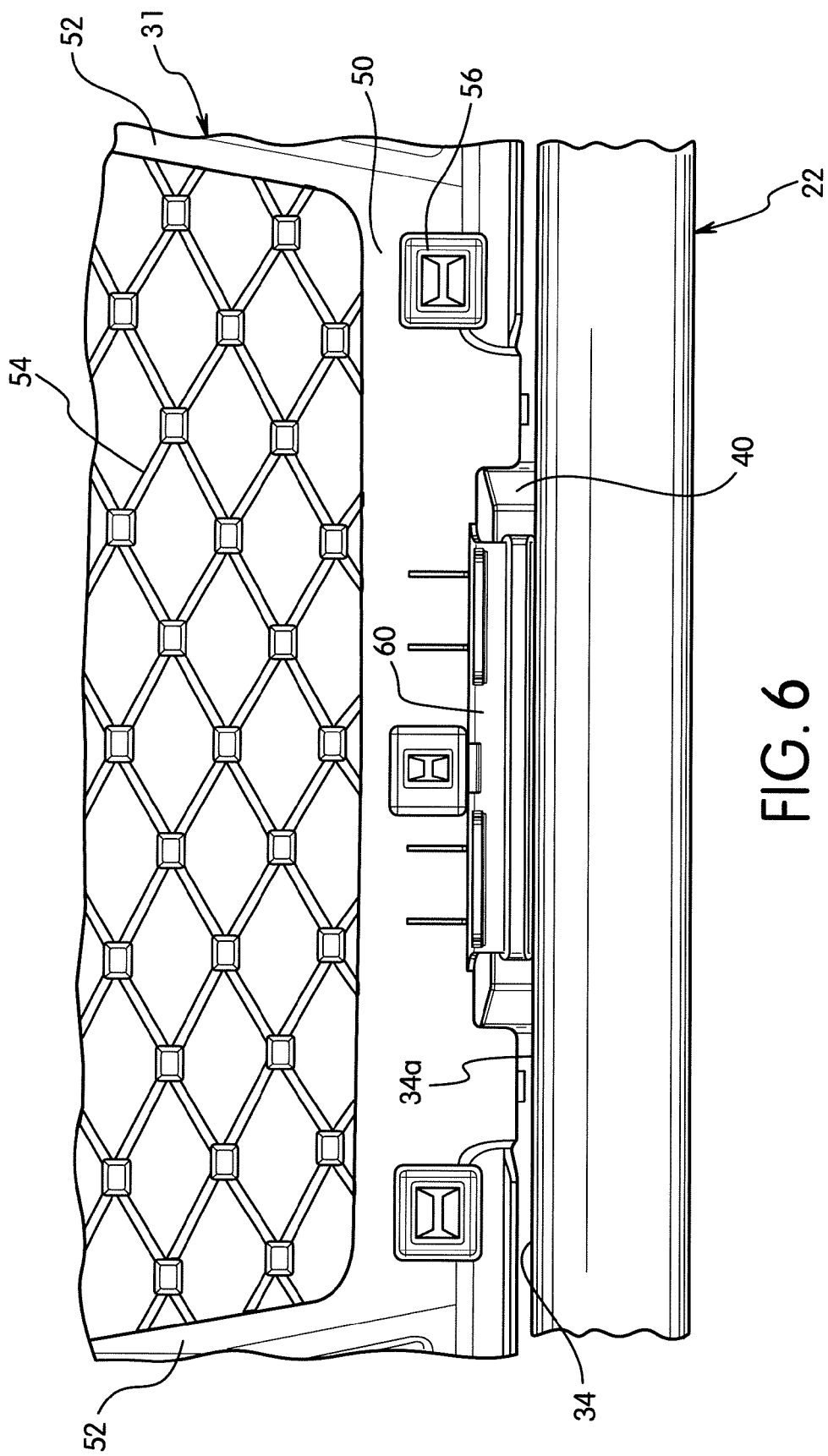
FIG. 6 is a front side elevational view of a central portion of the inner grille member and the bumper fascia of the vehicle front end structure illustrated in FIGS. 1 to 5.
Figure 7:
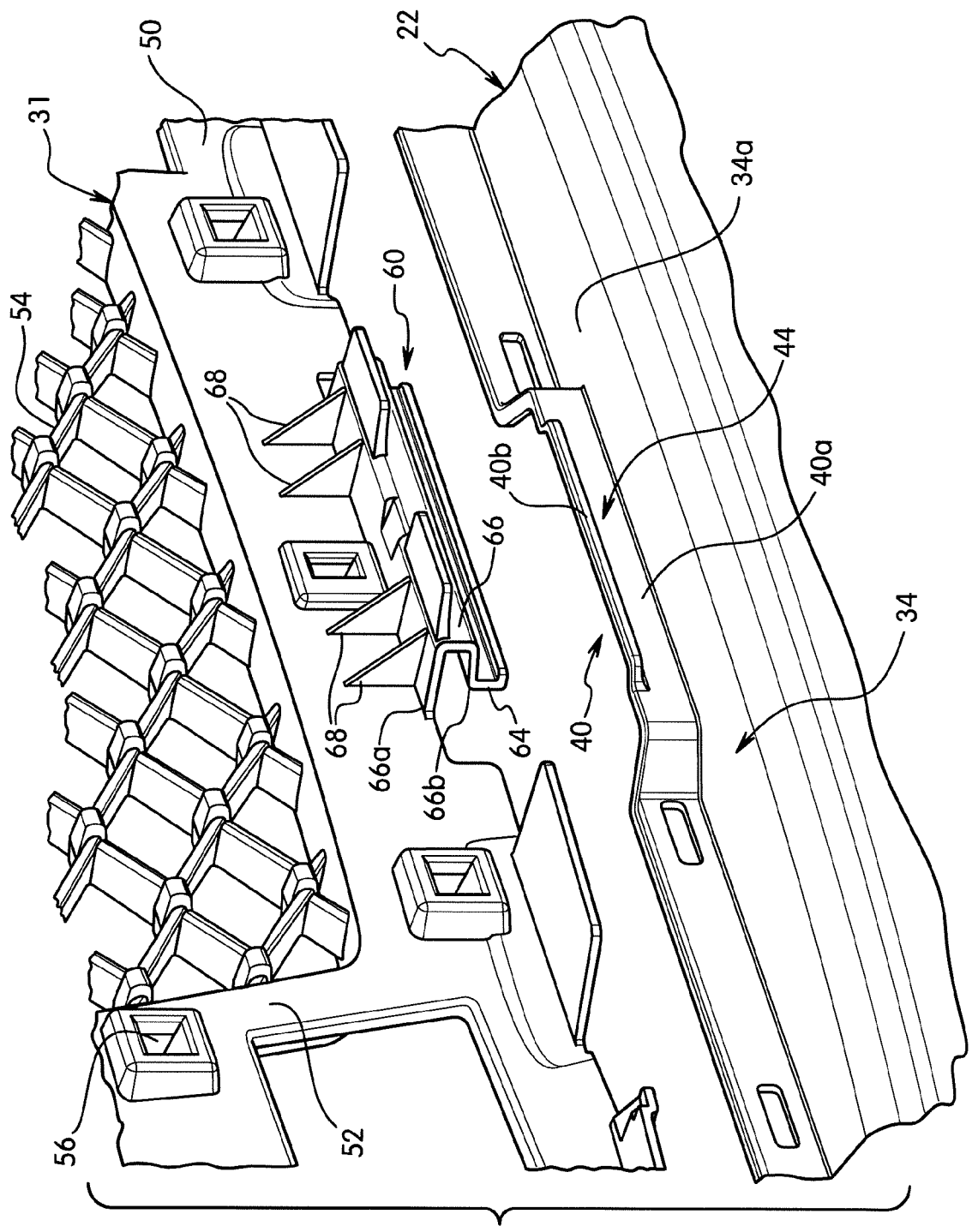
FIG. 7 is an exploded front side perspective view of the central portion of the inner grille member and the bumper fascia of the vehicle front end structure illustrated in FIG. 6.
Figure 8:
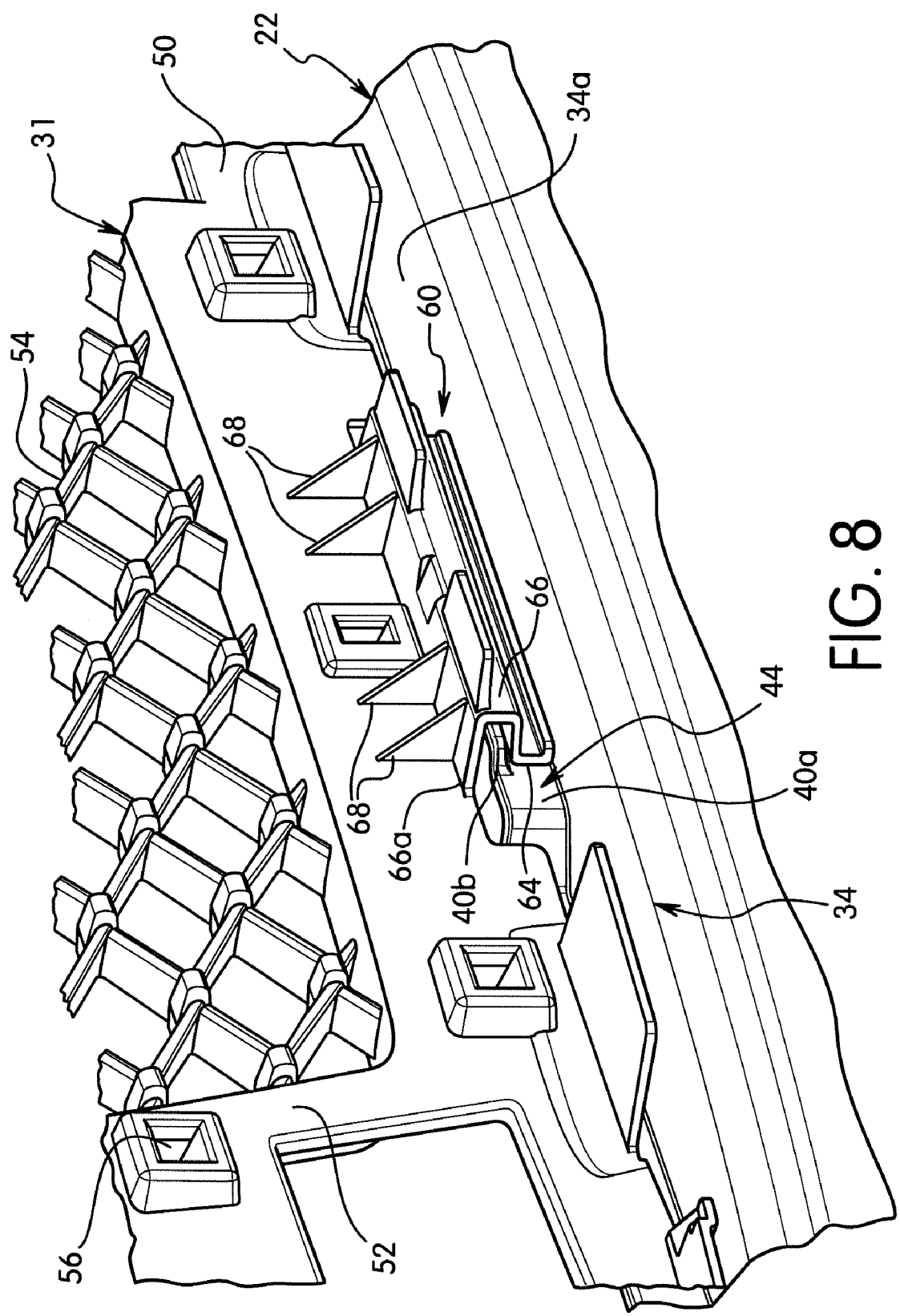
FIG. 8 is a front side perspective view of the central portion of the inner grille member and the bumper fascia of the vehicle front end structure illustrated in FIGS. 6 and 7.

As indicated in FIGS. 5, 6 and 7, the center receiving member 40 extends laterally along the sill portion 34. Further, as shown in FIG. 7, the center channel 44 and its corresponding channel opening also extend laterally along the sill portion 34. Further, the channel opening extends in a lengthwise direction (left and right directions in FIGS. 5, 6 and 7) of the center channel 44. Hence, lateral ends of the center channel 44 are open.

As seen in FIGS. 10 to 13, the first and second lateral positioning sill sections 34b and 34c are non-coplanar and limit movement of the inner grille member 31 in a lateral vehicle direction. The first and second lateral positioning sill sections 34b and 34c also supports the inner grille member 31 of the grille assembly 24 to aid in maintaining equal lateral gaps between the grille assembly 24 and the lamp assemblies 26. In particular, the first and second lateral positioning sill sections 34b and 34c of the sill portion 34 includes the first and second lateral receiving members 41 and 42, respectively. The first and second lateral receiving members 41 and 42 extends upwardly from the first and second lateral positioning sill sections 34b and 34c of the sill portion 34 and directly contacts the inner grille member 31 of the grille assembly 24 to aid in maintaining equal lateral gaps between the grille assembly 24 and the lamp assemblies 26.

The first lateral receiving member 41 defines a first lateral channel 46 with the first lateral channel 46 having its channel opening extending in a forward vehicle facing direction. The first lateral receiving member 41 has an L-shaped cross sectional profile. A first part 41a of the L-shaped cross sectional profile extends from the sill portion 34 and a second part 41b of the L-shaped cross sectional profile extends forward from the first part such that the first lateral channel 46 is defined by the first part 41a, the second part 41b and the sill portion 34.

The second lateral receiving member 42 defines a second lateral channel 48 with the second lateral channel 48 having its channel opening extending in a forward vehicle facing direction. The second lateral receiving member 42 has an L-shaped cross sectional profile. A first part 42a of the L-shaped cross sectional profile extends from the sill portion 34 and a second part 42b of the L-shaped cross sectional profile extends forward from the first part such that the second lateral channel 48 is defined by the first part 42a, the second part 42b and the sill portion 34.

The inner grille member 31 is a one-piece, unitary member foamed of a rigid plastic material or any other suitable material. The inner grille member 31 has a peripheral support portion 50, a pair of inner support portions 52 and a grille portion 54. The peripheral support portion 50 and the inner support portions 52 are provided with a plurality of attachment slots 56 such that the outer grille member 32 is snap-fitted to the inner grille member 31. The grille portion 54 is divided into three sections such that an outer periphery of the grille portion 54 surrounded by the peripheral support portion 50 of the inner grille member 31.

In this illustrated embodiment, the peripheral support portion 50 of the inner grille member 31 includes three support members (e.g., a weight bearing support member 60, a first positioning support member 61 and a second positioning support member 62. The support members 60 to 62 of the inner grille member 31 each cooperate with the sill portion 34 of the vehicle bumper fascia 22 to support and position the grille assembly 24 within the grille opening O. The support members 60 to 62 of the inner grille member 31 each includes an end disposed forward of a forward face of the grille portion 54 of the inner grille member 31. The weight bearing support member 60 is located at a center location of a lower edge of the peripheral support portion 50 of the inner grille member 31. The first and second positioning support members 61 and 62 are formed at a periphery of the peripheral support portion 50 of the inner grille member 31. The first and second positioning support members 61 and 62 are located at a lower edge of the peripheral support portion 50 of the inner grille member 31.

The support members 60, 61 and 62 are disposed in the channels 44, 46 and 48 of the receiving members 40, 41 and 42, respectively, with each of the channels 44, 46 and 48 of the receiving members 40, 41 and 42 limiting movement of the support members 60, 61 and 62 of the inner grille member 31 in direction normal (vertical and horizontal) to the forward vehicle facing direction as explained below. Thus, the support members 60, 61 and 62 cooperate with the receiving members 40, 41 and 42, respectively, to prevent the inner grille member 31 from separating from the vehicle bumper fascia 22 in a vertical vehicle direction and a horizontal vehicle direction.

The weight bearing support member 60 is disposed in the center channel 44 of the center receiving member 40 to support the inner grille member 31. With this arrangement, the inner grille member 31 and the outer grille member 32 are positioned in a vertical vehicle direction relative to the vehicle bumper fascia 22. The weight bearing support member 60 includes a center contact portion 64 and a U-shaped connecting portion 66.

As mentioned above (and indicated in FIG. 7) the center receiving member 40 restricts movement of the weight bearing support member 60 in directions normal to the forward vehicle facing direction. More specifically, the center receiving member 40 restricts movement of the weight bearing support member 60 at least in vertical directions. However, since the lateral ends or sides of the center channel 44 are open, movement of the weight bearing support member 60 is unrestricted in the lengthwise direction of the center channel 44. In other words, the center channel 44, itself, does not restrict side-to-side movement of the weight bearing support member 60 along the length of the center channel 44.

As best seen in FIG. 9, the center contact portion 64 of the weight bearing support member 60 includes a distal portion that extends in the forward vehicle direction of the vehicle 10. This distal portion of the center contact portion 64 is intended to contact the bumper fascia 22 to distribute the weight of the grille assembly 24 to the bumper fascia 22 and bumper beam 20 disposed under the bumper fascia 22.

Still referring to FIG. 9, the U-shaped connecting portion 66 has a first end 66a connected to the peripheral support portion 50 of the inner grille member 31 and a second end 66b connected to the center contact portion 64. With this arrangement, the center contact portion 64 is cantilevered with respect to the peripheral support portion 50 of the inner grille member 31. The U-shaped connecting portion 66 of the weight bearing support member 60 extends around a distal free edge of the center channel 44 of the center receiving member 40. The weight bearing support member 60 contacts the sill portion 34 within the center channel 44 such that the inner grille member 31 and the outer grille member 32 are positioned in a vertical vehicle direction relative to the vehicle bumper fascia 22. The center contact portion 64 of the weight bearing support member 60 extends along the sill portion 34 to support weight of the grille assembly 24. The weight bearing support member 60 further includes four reinforcement ribs 68 that extend from the peripheral support portion 50 of the inner grille member 31 to the connecting portion 66.

The first and second positioning support members 61 and 62 are identical, except that they are mirror images of each other, thus, only the second positioning support member 62 will be shown in detail. The first and second positioning support members 61 and 62 are disposed in the first and second channel 46 and 48 of the first and second lateral receiving members 41 and 42, respectively, to support the inner grille member 31. With this arrangement, the inner grille member 31 and the outer grille member 32 are positioned in a vertical vehicle direction relative to the vehicle bumper fascia 22.

As seen in FIG. 13, the first positioning support member 61 includes a lateral contact portion 70 and a connecting portion 72. The connecting portion 72 has a first end 72a connected to the peripheral support portion 50 of the inner grille member 31 and a second end 72b connected to the lateral contact portion 70. With this arrangement, the lateral contact portion 70 is cantilevered with respect to the peripheral support portion 50 of the inner grille member 31. The connecting portion 72 of the first positioning support member 61 extends around a distal free edge of the lateral channel 46 of the first lateral receiving member 41. The first positioning support member 61 contacts the sill portion 34 within the lateral channel 46 such that the inner grille member 31 and the outer grille member 32 are positioned in a horizontal vehicle direction relative to the vehicle bumper fascia 22. The connecting portions 72 of the first and second positioning support member 61 and 62 include a tuning portion 74 of reduced thickness to permit selective deformation of a free end of the first and second positioning support member 61 and 62.

As seen in FIG. 14, the second positioning support member 62 includes a lateral contact portion 80 and a connecting portion 82. The connecting portion 82 has a first end 82a connected to the peripheral support portion 50 of the inner grille member 31 and a second end 82b connected to the lateral contact portion 80. With this arrangement, the lateral contact portion 80 is cantilevered with respect to the peripheral support portion 50 of the inner grille member 31. The connecting portion 82 of the second positioning support member 62 extends around a distal free edge of the lateral channel 48 of the second lateral receiving member 42. The second positioning support member 62 contacts the sill portion 34 within the lateral channel 48 such that the inner grille member 31 and the outer grille member 32 are positioned in a horizontal vehicle direction relative to the vehicle bumper fascia 22. The connecting portions 82 of the second positioning support member 62 include a tuning portion 84 of reduced thickness to permit selective deformation of a free end of the second positioning support member 62.

In this illustrated embodiment, the tuning portions 74 and 84 are formed as tuning channels that allow for limited deformation of the first and second positioning support member 61 and 62. The tuning portions 74 and 84 are called tuning portions because the addition or reduction of the thickness of the tuning portions 74 and 84 can be performed easily within the injection mold to alter the deformation amount of the first and second positioning support members 61 and 62.

As best seen in FIGS. 3 and 4, the outer grille member 32 is a one-piece, unitary member formed of a rigid plastic material or any other suitable material. The outer grille member 32 has a peripheral covering portion 90 and a pair of inner covering portions 92. The peripheral covering portion 90 and the inner covering portions 92 define three grille apertures 94. The outer grille member 32 is disposed along at least a portion of the peripheral support portion 50 of the inner grille member 31 on a forward vehicle facing side of the inner grille member 31. The outer grille member 32 conceals the receiving members 40, 41 and 42 and the support members 60, 61 and 62 from view in a longitudinal vehicle direction. The peripheral covering portion 90 has an outer lower edge that is proximal to the vehicle bumper fascia 22. The outer edge of the peripheral covering portion 90 of the outer grille member 32 is spaced apart from the vehicle bumper fascia 22 by a prescribed gap.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle end structure. Accordingly, these terms, as utilized to describe the present invention should be interpreted relative to a vehicle equipped with the vehicle end structure. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle end structure comprising:
a vehicle bumper fascia including a sill portion partially defining a grille opening and a receiving member extending from the sill portion, the receiving member defining a channel with a channel opening extending in a forward vehicle facing direction; and
a grille assembly including an inner grille member and an outer grille member with the inner and outer grille members being coupled together,
the inner grille member extending substantially within the grille opening, the inner grille member having a peripheral portion with a support member formed at a periphery of the peripheral portion of the inner grille member, the support member being disposed in the channel of the receiving member with the channel of the receiving member limiting movement of the support member of the inner grille member in a direction normal to the forward vehicle facing direction, the inner grille member further includes a grille portion with an outer periphery of the grille portion surrounded by the peripheral portion of the inner grille member, and the support member of the inner grille member includes an end disposed forward of a forward face of the grille portion of the inner grille member, and
the outer grille member being disposed along at least a portion of the peripheral portion of the inner grille member on a forward vehicle facing side of the inner grille member, the outer grille member concealing the support member from view in the forward vehicle facing direction.

2. The vehicle end structure according to claim 1, wherein the receiving member has an L-shaped cross sectional profile with a first part of the L-shaped cross sectional profile extending from the sill portion and a second part of the L-shaped cross sectional profile extending forward from the first part such that the channel is defined by the first part, the second part and a section of the sill portion, and the channel opening is defined between the second part and the section of the sill portion.

3. The vehicle end structure according to claim 1, wherein the support member is located at a lower edge of the peripheral portion of the inner grille member.

4. The vehicle end structure according to claim 1, wherein the outer grille member includes a peripheral portion having an outer edge that is proximal to the vehicle bumper fascia.

5. The vehicle end structure according to claim 4, wherein the outer edge of the peripheral portion of the outer grille member is spaced apart from the bumper vehicle fascia by a prescribed gap.

6. The vehicle end structure according to claim 1, further comprising
a bumper beam disposed under the vehicle bumper fascia.

7. The vehicle end structure according to claim 1, wherein the support member constitutes a weight bearing support member that is located at a center location of a lower edge of the peripheral portion of the inner grille member.

8. The vehicle end structure according to claim 7, wherein the weight bearing support member contacts the section of the sill portion within the channel such that the inner grille member and the outer grille member are positioned in a vertical vehicle direction relative to the vehicle bumper fascia.

9. The vehicle end structure according to claim 7, wherein the weight bearing support member includes a contact portion that extends along the sill portion to support weight of the grille assembly.

10. The vehicle end structure according to claim 1, wherein the sill portion includes a first lateral positioning sill section and a second sill section with the first and second sill sections being non-coplanar and limiting movement of the inner grille member in a lateral vehicle direction.

11. A vehicle end structure comprising:
a vehicle bumper fascia including a sill portion partially defining a grille opening and a receiving member extending from the sill portion, the receiving member defining a channel with a channel opening extending in a forward vehicle facing direction; and
a grille assembly including an inner grille member and an outer grille member with the inner and outer grille members being coupled together,
the inner grille member extending substantially within the grille opening, the inner grille member having a peripheral portion with a support member formed at a periphery of the peripheral portion of the inner grille member, the support member being disposed in the channel of the receiving member with the channel of the receiving member limiting movement of the support member of the inner grille member in a direction normal to the forward vehicle facing direction, the support member including a contact portion and a U-shaped connecting portion with the U-shaped connecting portion having a first end connected to the peripheral portion of the inner grille member and a second end connected to the contact portion such that the contact portion is cantilevered with respect to the peripheral portion of the inner grille member, and
the outer grille member being disposed along at least a portion of the peripheral portion of the inner grille member on a forward vehicle facing side of the inner grille member, the outer grille member concealing the support member from view in the forward vehicle facing direction.

12. The vehicle end structure according to claim 11, wherein
the U-shaped connecting portion of the support member extends around a distal free edge of the channel of the receiving member.

13. The vehicle end structure according to claim 11, wherein
the sill portion includes a first lateral positioning sill section and a second lateral positioning sill section with the first and second lateral positioning sill sections being non-coplanar and limiting movement of the inner grille member in a lateral vehicle direction.

14. The vehicle end structure according to claim 13, wherein
the support member is located between the first and second lateral positioning sill sections.

15. The vehicle end structure according to claim 14, wherein
the support member extends horizontally along the inner grille member.

16. The vehicle end structure according to claim 11, wherein
the support member constitutes a weight bearing support member that is located at a center location of a lower edge of the peripheral portion of the inner grille member.

17. A vehicle end structure comprising:
a vehicle bumper fascia including a sill portion partially defining a grille opening and a receiving member extending from the sill portion, the receiving member defining a channel having a channel opening extending in a lengthwise direction of the channel along the sill portion and being open to a forward vehicle facing direction; and
a grille assembly including an inner grille member and an outer grille member with the inner and outer grille members being coupled together,
the inner grille member extending substantially within the grille opening, the inner grille member having a peripheral portion with a support member formed at a periphery of the peripheral portion of the inner grille member, the support member being disposed in the channel of the receiving member with the channel of the receiving member limiting movement of the support member of the inner grille member in directions normal to surfaces of the channel, movement of the support member being unrestricted in the lengthwise direction of the channel, the support member constituting a weight bearing support member that is located at a center location of a lower edge of the peripheral portion of the inner grille member,
the outer grille member being disposed along at least a portion of the peripheral portion of the inner grille member on a forward vehicle facing side of the inner grille member, the outer grille member concealing the support member from view in the forward vehicle facing direction, and
the weight bearing support member including a contact portion and a U-shaped connecting portion with the U-shaped connecting portion having a first end connected to the peripheral portion of the inner grille member and a second end connected to the contact portion such that the contact portion is cantilevered with respect to the peripheral portion of the inner grille member.

18. The vehicle end structure according to claim 17, wherein
the weight bearing support member further includes at least one reinforcement rib extending from the inner grille member to the connecting portion.

19. The vehicle end structure according to claim 17, wherein
the sill portion includes a first lateral positioning sill section and a second lateral positioning sill section with the first and second lateral positioning sill sections being non-coplanar and limiting movement of the inner grille member in a lateral vehicle direction.

20. The vehicle end structure according to claim 19, wherein
the support member is located between the first and second lateral positioning sill sections.

21. The vehicle end structure according to claim 20, wherein
the support member extends horizontally along the inner grille member.

22. A vehicle end structure comprising:
a vehicle bumper fascia including a sill portion partially defining a grille opening and a receiving member extending from the sill portion, the receiving member defining a channel having a channel opening extending in a lengthwise direction of the channel along the sill portion and being open to a forward vehicle facing direction; and
a grille assembly including an inner grille member and an outer grille member with the inner and outer grille members being coupled together,
the inner grille member extending substantially within the grille opening, the inner grille member having a peripheral portion with a support member formed at a periphery of the peripheral portion of the inner grille member, the support member being disposed in the channel of the receiving member with the channel of the receiving member limiting movement of the support member of the inner grille member in directions normal to surfaces of the channel, movement of the support member being unrestricted in the lengthwise direction of the channel, and
the outer grille member being disposed along at least a portion of the peripheral portion of the inner grille member on a forward vehicle facing side of the inner grille member, the outer grille member concealing the support member from view in the forward vehicle facing direction,
the sill portion includes a first lateral positioning sill section and a second sill section with the first and second sill sections being non-coplanar and limiting movement of the inner grille member in a lateral vehicle direction,
the receiving member of the vehicle bumper fascia constitutes a first receiving member located on the first lateral positioning sill section,
the support member of the inner grille member constitutes a first positioning support member,
the vehicle bumper fascia further includes a second receiving member located on the second sill section, the second receiving member defining a second channel with a second channel opening extending in the forward vehicle facing direction, and
the inner grille member further includes a second positioning support member formed at a periphery of the peripheral portion of the inner grille member, with the second positioning support member being disposed in the second channel of the second receiving member and limiting movement of the second positioning support member of the inner grille member in the direction normal to the forward vehicle facing direction.

23. The vehicle end structure according to claim 22, wherein
at least one of the first and second positioning support members includes a tuning portion of reduced thickness to permit selective deformation of a free end of the at least one of the first and second positioning support members.

24. The vehicle end structure according to claim 22, wherein
the vehicle bumper fascia further includes a center receiving member located on a center sill section between the first and second sill sections, the center receiving member defining a third channel with a third channel opening extending in the forward vehicle facing direction, and
the inner grille member further includes a weight bearing support member that is located at a center location of a lower edge of the peripheral portion of the inner grille member, with the weight bearing support member being disposed in the third channel of the center receiving member and supporting the inner grille member such that the inner grille member and the outer grille member are positioned in a vertical vehicle direction relative to the vehicle bumper fascia.

25. The vehicle end structure according to claim 24, wherein
the weight bearing support member includes a contact portion and a U-shaped connecting portion with the U-shaped connecting portion having a first end connected to the peripheral portion of the inner grille member and a second end connected to the contact portion such that the contact portion is cantilevered with respect to the peripheral portion of the inner grille member.

26. The vehicle end structure according to claim 25, wherein
the weight bearing support member further includes at least one reinforcement rib extending from the inner grille member to the connecting portion.

27. The vehicle end structure according to claim 22, wherein
the support member is located between the first and second lateral positioning sill sections.

28. The vehicle end structure according to claim 27, wherein
the support member extends horizontally along the inner grille member.

29. The vehicle end structure according to claim 22, wherein
the support member is located at a center location of a lower edge of the peripheral portion of the inner grille member.

* * * * *